May 2, 1939. G. G. KRUESI 2,156,297
RADIO COMPASS
Filed Sept. 30, 1936 3 Sheets-Sheet 1

INVENTOR
GEOFFREY G. KRUESI
BY
ATTORNEYS

May 2, 1939. G. G. KRUESI 2,156,297
RADIO COMPASS
Filed Sept. 30, 1936 3 Sheets-Sheet 2

INVENTOR
GEOFFREY G. KRUESI
BY
ATTORNEYS

May 2, 1939.

G. G. KRUESI 2,156,297

RADIO COMPASS

Filed Sept. 30, 1936

INVENTOR
GEOFFREY G. KRUESI
BY
ATTORNEYS

Patented May 2, 1939

2,156,297

UNITED STATES PATENT OFFICE 2,156,297

RADIO COMPASS

Geoffrey G. Kruesi, Dayton, Ohio

Application September 30, 1936, Serial No. 103,325

6 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

My invention pertains to improvements in radio direction finding apparatus, in particular radio homing devices for determining the direction of arrival of radio waves in the horizontal plane and is especially adaptable for use as a guide to the pilot of small air craft, that is, itinerary aircraft or military pursuit, whereby such aircraft may readily be directed in the direction of a landing field during period of low visibility, such as fogs, rains and storms. In particular the invention relates to a novel system of visual type radio compass with right and left visual indications and which uses two uni-directional antennae.

It is well known in the art that radio direction finding systems can be employed which, in order to produce visually, right or left indications, use a directional antenna, such as a loop aerial and a non-directional antenna such as a vertical mast. Under certain conditions the combining of the effects of the loop and vertical antennae results in a cardioid which, for the uni-directional types of direction finders, is caused to rotate and for the bilateral types is caused to reverse its polarity alternately. Various methods have heretofore been disclosed for causing the cardioid produced in the uni-lateral type of radio direction finder to rotate and to alternately reverse its polarity in the bilateral type. An important factor in the use of loop and vertical antennae where the respective antenna effects are to be combined is the provision of means to shift the phase of the output of the loop to approximately coincide with the phase of the output of the vertical antenna, since if the vertical antenna is located at the center of the loop and both loop and vertical antennae are tuned to resonance, the output current of the loop will be in phase quadrature to the output current of the vertical antenna, and the sum of the two currents will be the same regardless of the phase polarity that is chosen between the currents of the two antennae.

A further requirement that has to be met in order to assure maximum sensitivity is that the physical dimensions of loop and vertical antenna are so chosen that the maximum current amplitudes of both the directional and non-directional antennae are equal in two directions essentially 180° apart and lying in the plane of the loop aerial. The use of loop aerials on small aircraft has certain disadvantages in that the air drag becomes comparatively great to that of the airplane. Furthermore, the weight and physical dimensions become excessive, factors which are of considerable importance.

In my copending application Nos. 699,719, filed November 25, 1933, Patent No. 2,142,133, granted January 3, 1938, and 5,566, filed February 8, 1935, novel means are disclosed to bring about the correct phase and amplitude relations between loop and antenna currents over required frequency ranges so as to obtain cardioid characteristics which periodically reverse their directional sense without changing their form during reversals in order to obtain maximum accuracy between front and rear bearings consistent with maximum obtainable sensitivity over said required frequency ranges. Such a system requires certain means to bring about an in-phase condition between two antennae having inherently different characteristics.

In principle my invention makes use of two independent, substantially uni-directional antennae having similar characteristics that are symmetrically placed to either side of the longitudinal axis of the moving vehicle, such as aircraft or seagoing vessels. This is done by periodically and alternately reversing the phase of the loop effect relative to that of the antenna effect or vice versa. It becomes obvious that if two symmetrically disposed aerials having a uni-directional characteristic are used, the problem in reversing said characteristics becomes one of merely switching from one uni-directional antenna to the other, instead of alternately reversing the relative phase between said antennae. Since it is not essential to resort in particular to antenna structures that render a cardioid characteristic, other single antenna means having substantially or approximately a uni-directional characteristic may be employed. Such antenna means are well known in the art and will be referred to in detail later. Depending upon the spacial disposition of these uni-directional antennae, accordingly different results may be obtained.

Thus, for instance, a pair of uni-directional antennae may be connected to a commutating means whereby the respective antenna currents of said antennae are brought into phase by locating said antennae in a plane which is normal to the longitudinal axis of the airplane. If the direction of the incoming radio waves coincides with the longitudinal axis, and the respective axis of maximum directive effect of said antennae has a predetermined angle to either side of the longitudinal axis of the airplane, then, switching from one antenna to the other periodically and alternately will evidently produce equal signal intensities provided that the electrical characteristics of said antennae are made equal.

It is, therefore, still a further object of this invention to provide balancing means whereby the directive effects of two antennae placed to either side of the longitudinal axis of a moving vehicle may be made the same for any direction deviating from that of the longitudinal axis of the craft.

If the electrical circuit arrangement is chosen such, that by virtue of the commutating means, only one of the two antennae is operative at a time then, under conditions as explained in the foregoing, it becomes obvious that the received energies during successive cycles of commutation are the same. Likewise the detected outputs effecting the moving coil of an alternating current type dynamometer instrument are also the same. Under these conditions, by energizing the stationary or field coils of said instrument with an alternating current having a frequency which is equal and in synchronism with the rate of commutation of the radio frequency currents supplied by the respective uni-directional antenna, the needle will assume a balanced position coincident with the center of the scale of the instrument.

Any deviation of the craft from the direction of the incoming radio waves will immediately result in an indication of the needle to either right or left depending upon the sense of deviation of the craft and of course on the form of the uni-directional characteristics of the respective antennae. It is obvious that if said antennae should have a non-directional characteristic the impulses received would be the same for any deviation during successive cycles of commutation and the needle of the indicating instrument would stay balanced, showing zero, for any direction of incoming radio waves.

It will be shown later that, depending on the direction of the maximum polar field vector of the respective uni-directional antennae relative to the direction of the longitudinal axis of the craft, distinctly different results are obtained. Thus, for instance, if the maximum field vectors are at right angles to the longitudinal axis two bearings, i. e., front and rear bearings substantially 180° apart will be obtained. The respective sensitivity of right and left indications in the two directions is substantially the same in this case, a characteristic behavior which is common to the type of radio compasses which use the combined effects of a loop and antenna.

On the other hand, if the two respective axes of maximum field vector of the directional characteristics make an angle of 45° with the direction of longitudinal axis of the airplane then, as will be shown, the sensitivity of one bearing indication, either front or rear, will predominate over that of the other.

It is, therefore, another object of this invention to provide means whereby a substantially predominating sensitivity of bearing indication may be obtained over the entire 360°, thereby making it unnecessary for the pilot to interpret front and rear bearings 180° apart by observing the relative swing of the compass indicator needle relative to the azimuth swing of the heading of the airplane.

In the above-described system, it is evident that the sensitivity of indication and the sense of direction of the same must necessarily depend on the difference of current amplitudes received by the moving coil of the indicating instrument during successive half cycles of commutation of the reversing means for a given deviation of the longitudinal axis of the airplane relative to the direction of the incoming radio waves. If the longitudinal axis of the airplane is coincident with said direction of the incoming radio waves, this difference of current amplitudes will become zero and it follows therefrom that the moving coil of the indicating instrument is under a physical balanced stress. The reason for this lies in the fact that during successive half cycles of the reversing means, the respective output currents in the moving coil of the indicator are due to the presence of the modulated carrier at the input circuit of the receiver.

It is a further object of my invention to so connect two antennae having uni-directional characteristics respectively that a phase reversal between the respective antenna currents is used to indicate the direction of incoming radio waves.

It is a well-known principle that if two identical antennae, either directional or non-directional are spaced a given distance apart and the plane containing both antennae is perpendicular to the direction of the incoming radio wave, the currents induced in said antennae will be of equal amplitudes and phase and if said antennae are connected to an input circuit in opposite sense or differential fashion the resultant current in the input or collective circuit becomes zero.

If the normal of the plane containing the two antennae, however, makes an angle with the direction of the incoming wave the current of the antenna conductor which is nearest to the transmitting station will be leading with respect to that received by the other, i. e., its phase is advanced. As the normal of the plane is turned from one side of the longitudinal axis to the other, it follows that the combined effect of both antennae undergoes a phase reversal, i. e., a phase change of plus or minus 180°.

I have shown in U. S. Patent No. 1,868,945 issued July 26, 1932, and also my copending U. S. application Nos. 699,719 and 5,566 that it is possible to indicate a phase reversal by the use of a balanced modulator circuit of either the "conjugate" or the "common" input type. In the most practical form the balanced modulator circuit or broadly, reversing means, has been operated at a high speed of alternation so that the alternate addition and subtraction of the loop and antenna outputs have produced a modulation of the carrier applied to the radio receiver at an audio frequency. The phase of the audio frequency current derived from the output of the receiver is then compared with the phase of the audio frequency current employed to actuate the balanced modulator circuit by means of an alternating current type dynamometer instrument, the latter of which is capable of indicating relative plus or minus polarities existing between said audio frequency currents. This polarity is employed as an indication of the relative direction of deviation of the direction of arrival of radio waves from that of the normal of the plane of the loop.

Since a phase reversal is obtained by producing side band frequencies from either the loop or antenna output, it is necessary to supply either side band frequency output with the carrier frequency output of the other antenna in order to obtain a detected audio component having the fundamental frequency of the audio oscillator which actuates the balanced modulator circuit. It has been difficult in the past to adjust the amplitude of said carrier to that of the side bands in order to obtain ideal cardioid characteristics. Therefore, in the types of radio compasses utilizing a loop and an antenna the carrier to be supplied has to be of a definite, predetermined value in order to assure best results.

In accordance with the present invention, two uni-directional antennae having similar characteristics are spaced a given distance apart and are disposed in a plane that is perpendicular to the longitudinal axis of an airplane to render the respective currents of said antennae equal in amplitude and phase in a direction of the incoming wave that is coincident with said longitudinal axis and are associated with means for producing side band frequency currents from said antennae that have uni-directional characteristics and in such a manner that a phase reversal of said currents is obtained when the direction of the incoming radio wave changes from one side of the longitudinal axis of the airplane to the other.

In my present invention the magnitude of the supplied carrier frequency current is of little importance. It can be shown that a small amplitude is sufficient to bring about proper detection of the uni-directional side bands. Since the phase of the uni-directional side bands is reversed when the normal of the plane containing the two unidirectional antennae passes through the direction of the incoming radio waves, it may be seen that the phase polarity of the audio frequency current envelope applied to the moving coil of a dynamometer type indicator will be an indication of the direction of the incoming radio waves.

It is to be understood in accordance with my invention, that the carrier which is supplied by the antenna serves primarily the purpose of detecting the uni-directional side bands and not, as is the case where loop and antenna effects are combined, to convert a loop characteristic into that of a cardioid, i. e., a uni-directional characteristic. The reason obviously lies in the fact that the characteristic of the two antennae are already uni-directional. Furthermore, since the induced electromotive forces of the uni-directional antennae and that of the antenna are in phase to start with, it is no longer necessary to bring about a phase shift between the respective currents of the two uni-directional antennae and the non-directional antenna.

The invention makes it possible to use various types of uni-directional antennae, which are well known to those skilled in the art. One of the better known uni-directional antennae is that suggested by Beverage, which makes use of a well-known principle in that the velocity of the propagation of a current flowing in a wire is adjusted to the velocity of propagation of the field created by said current and propagating along the direction of said wire. The method, as suggested by Beverage consists in terminating the far end of the wire by a suitable resistance, which is made equal to the so-called threshold impedance. The installation of such a directive system is comparatively simple and offers little difficulty when applied to an airplane. It is to be noted that the degree of directivity of such an arrangement depends in a measure upon the wave length received. In fact, the greater the physical dimension of the Beverage antenna compared to the wave length used, the greater directivity is being obtained. It is, therefore, obvious that when employed on aircraft, the Beverage antenna lends itself particularly useful for the reception of short waves and it is therefore possible to use my invention advantageously for determining the direction of incoming waves of frequencies of the order of 3,000 to 8,000 kilocycles.

Loop structures, which are to be tunable to high frequencies, as, for instance, of the order of 3,000 to 8,000 kilocycles, become, on account of inherently large distributed capacity effects, too small to be practical. The use of the uni-directional antennae overcomes this difficulty and it is therefore still a further object of this invention to provide means which make it possible to employ frequencies in the order from 3,000 to 8,000 kilocycles. It will be understood, however, that the uni-directional antennae, as shall be described later, will not be capable of overcoming the well-known night effect so that the above-mentioned high frequencies may only be used over a comparatively small distance within which propagation of the radio waves is made possible substantially by the ground component only. For use of these frequencies to effect blind landings said distances are quite sufficient and it is therefore an advantage to use these frequencies in localities where low frequencies cannot be employed, due to static interference or non-availability of the required frequency channels for the air port radio transmitters.

If it is desirable to overcome said-mentioned night effect, recourse may be taken to the use of a well-known type of antenna invented by Adcock, or those suggested by Franklin and Weagant. It is not at all difficult to render the Adcock antenna uni-directional by superimposing upon its characteristic, which, as is well known, is that of a figure 8, the effect of a single vertical antenna. Since the electromotive forces of the conductors of the Adcock antenna and an additional vertical antenna are inherently in phase, the difficulty in bringing about a phase shift between the directional and non-directional effects as is the case in the types of radio compasses employing loop and vertical antenna no longer exists. This type of antenna is particularly suitable for the reception of short waves. Since the effectiveness of reception depends in a measure on its physical dimension compared with that of the wave length received, the problem encountered in the installation of the Adcock aerial is somewhat more difficult than that met with in the case of the Beverage antenna. However, various solutions to overcome the problem will be shown later in this specification. It may be seen from the foregoing that my invention opens up possibilities for methods of direction finding with visual right-left indications that are believed to be novel and which have not been thought possible in the past. It is to be understood, however, that comparatively little data are in existence to this date, which pertain to the accuracy with which bearings may be taken with this type of antenna, particularly when considering the reception of short waves over long distances. It may be stated definitely on the other hand that observations which have been made so far indicate a great improvement in the results obtained over those that are achieved with the loop antenna. It is, therefore, another object of this invention to devise a system of visual direction finding which is substantially free from night errors by employing a pair of uni-directional Adcock antennae.

The invention itself, however, both as to its organization and method of operation, together with further objects and advantages thereof, will best be understood by reference to the following description when read in connection with the accompanying drawings, wherein:

Fig. 8 shows a directional field pattern for the antenna system of Fig. 7.

The filament heating circuits have been omitted from these circuits, as means for engaging the filaments are well known to those versed in the art.

Figure 1:
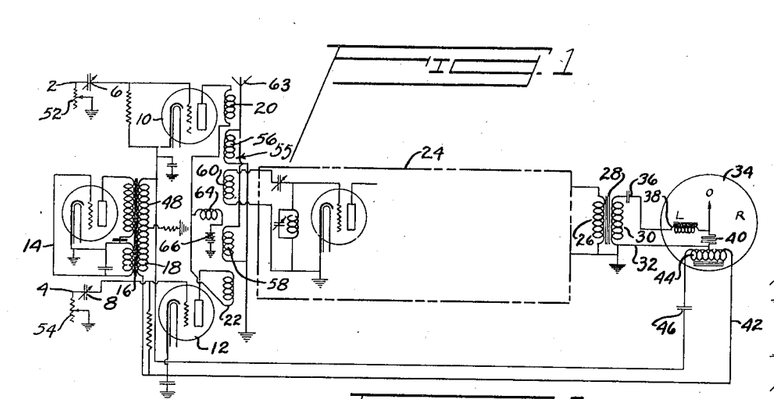
Fig. 1 is a schematic diagram of the circuit arrangement of one embodiment of my direction finder.

Making reference to the accompanying drawings and first directing special attention to Fig. 1, I will describe the various features of my invention. The uni-directional antennae 2 and 4 are shown to be capacitively coupled over condensers 6 and 8 to the grids of vacuum tubes 10 and 12. The audio frequency oscillator 14 is seen to be coupled by means of the audio frequency oscillating transformer 16 to the secondary coils 18 and 48 of said transformer; the secondaries 18 and 48 in turn supply an alternating current potential to the cathodes of the vacuum tubes 10 and 12, thereby making said vacuum tubes periodically and alternately operative at an audio frequency. The plate terminals are commonly connected over coils 20 and 22 by virtue of inductive couplings with coils 56 and 58 to coil 60 and thence to the input circuit of receiver 24. The output terminals of receiver 24 are connected to the primary 26 of audio frequency transformer 28, the secondary 30 of which is connected to the moving coil circuit 32 of indicator 34. The moving coil circuit 32 comprises a fixed condenser 36, audio frequency reactor 38 and moving coil 40. The tuned field coil circuit 42 consists of the dynamometer field coil 44, fixed capacity 46 and the balanced secondary coils 48 and 18 of oscillating transformer 16. 52 and 54 are terminating impedances, commonly known as so-called threshold impedances and shown to be variable for balancing purposes. A small auxiliary antenna 63 is furthermore connected to coils 56 and 58, the latter of which are connected in parallel.

Figure 2:
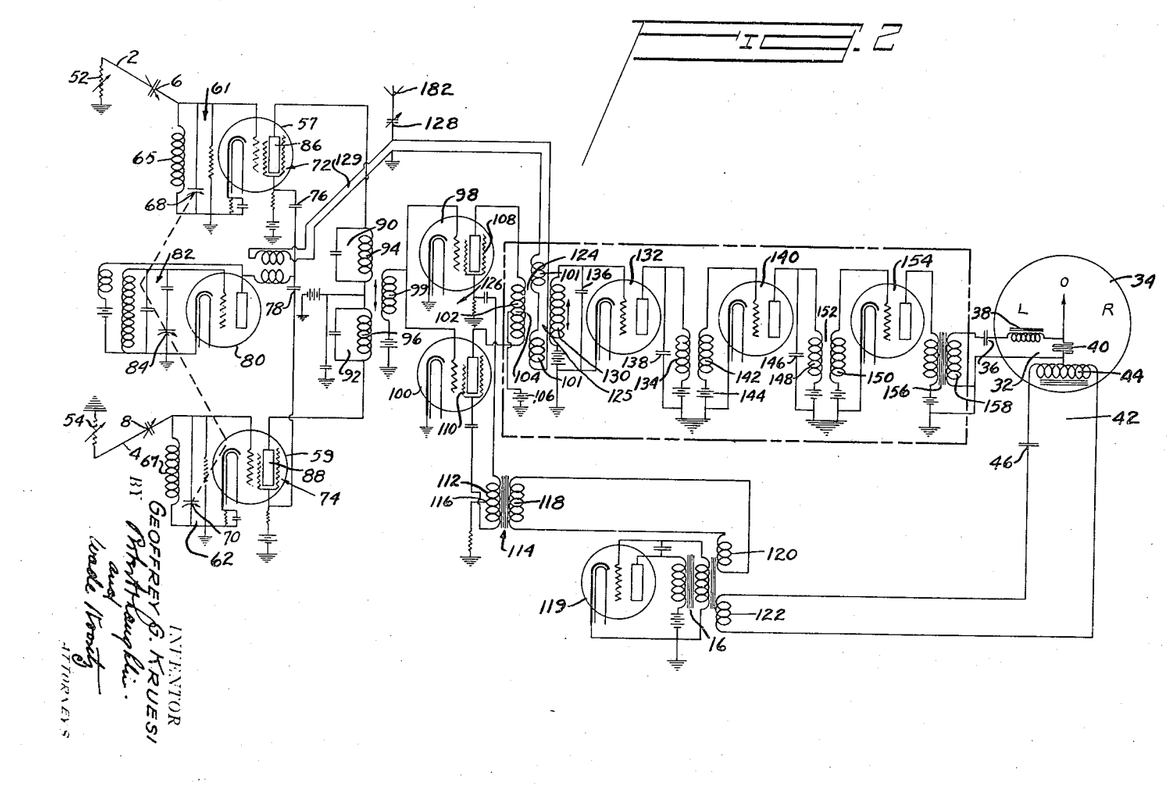
Fig. 2 is a schematic diagram of the circuit arrangement modified to make use of the superheterodyne principle.

With reference to Fig. 2 two uni-directional antennae 2 and 4 are again shown to be capacitively coupled over condensers 6 and 8 to the grids of vacuum tubes 57 and 59. These vacuum tubes are of the tetrode type. The input circuits 61 and 62 are shown to be consisting of inductances 65 and 67 and variable condensers 68 and 70. Shielded grids 72 and 74 of vacuum tubes 57 and 59 are shown to be capacitively coupled over capacities 76 and 78 to the plate of vacuum tube 80 which is part of the beating oscillator circuit 82. A small auxiliary antenna 182 is capacitively coupled to a link circuit 129, connecting the plate circuit of the beating oscillator 82 with the output circuit of the balanced modulator circuit 126. The rotors of condensers 68, 84 and 70 are mounted on one shaft in order to arrive at a single dial control arrangement. The plates 86 and 88 of modulator tubes 57 and 59 are connected to two tuned circuits 90 and 92, which are tuned to an intermediate frequency respectively. Inductances 94, 96 and 99 form an intermediate frequency transformer by which energy present in tuned circuits 90 and 92 is transferred to the input circuit of a balanced modulator circuit consisting of vacuum tubes 98 and 100, plate inductance 102, which has a midpoint 104, and which is connected to plate battery 106. Vacuum tubes 98 and 100 are again of the tetrode type. The shielded grids 108 and 110 are shown to be connected to the secondary 112 of audio frequency transformer 114, said secondary being grounded at midpoint 116. The primary 118 of audio frequency transformer 114 is shown to be connected to one of two balanced tertiary windings 120 and 122 of audio oscillating transformer 16. The other tertiary coil winding 122 is again connected to the tuned field coil circuit 42 of indicator 34 and consists of fixed capacity 46 and field coil 44. The intermediate frequency transformer 124 consisting of plate coil 102 of the balanced modulator circuit 126, and input coil 130 of the first intermediate frequency amplifier 132 serves the purpose of transferring energy coming from the balanced modulator circuit 126 to the first intermediate frequency amplifier 132. The input and output of said intermediate frequency amplifier are shown to be tuned by means of inductances 130 and 134, and fixed capacities 136 and 138 respectively. The first intermediate frequency amplifier 132 is coupled to the untuned input circuit of the second detector 140 and consists of secondary winding 142 and "C" battery 144 and tuned output circuit consisting of fixed condenser 146 and primary winding 148. The secondary winding 150 of intermediate frequency transformer 152 is connected to the audio frequency amplifier 154, the output of which is connected to audio frequency transformer 156, the secondary winding 158 of which is again connected to the moving coil circuit 32 and consisting of fixed capacity 36, reactor 38 and moving coil 40 of the dynamometer type indicator 34. Resistances 52 and 54 are again terminating resistances of the uni-directional antennae and made variable respectively in order to balance the directional effects of the two antennae.

Fig. 3 shows again two uni-directional antennae 2 and 4 comprising variable resistances 52 and 54 that are being coupled over condensers 6 and 8 to the tuned input circuits 61 and 62, the latter consisting of variable condensers 68 and 70 and inductances 65 and 67 respectively. The tuned circuits which are tuned to the frequency of the incoming radio waves are shown to be connected to the control grids 160 and 162 of pentodes 164 and 166. The suppressor grids 168 and 170 are connected to one of two tertiary windings 120 of the audio frequency oscillating transformer 16. The shielded grids 72 and 74 are commonly and capacitively coupled over condensers 76 and 78 to the plate terminal of vacuum tube 80, which is part of beat frequency oscillator circuit 82. The plate terminals 86 and 88 of pentodes 164 and 166 are shown to be connected to the tuned intermediate frequency circuits 172 and 173 in balanced modulator fashion, the circuit being of the modified common input type balanced modulator, as illustrated and explained in my copending application No. 5,566. The tuned intermediate frequency circuits 172 and 173 are, by virtue of inductive coupling coils 174 and 176 and coil 127, connected to the first intermediate frequency amplifier, as indicated by arrows. The remaining part of amplifier circuit, detector, audio frequency amplifier and indicator is identical with that of the circuit arrangement shown in Fig. 2. The rotors of variable condensers 84, 68 and 70 are again mounted on a common shaft in order to arrive at a single dial control means.

Figures 4, 4A, 5, 5A, 6, 6A:
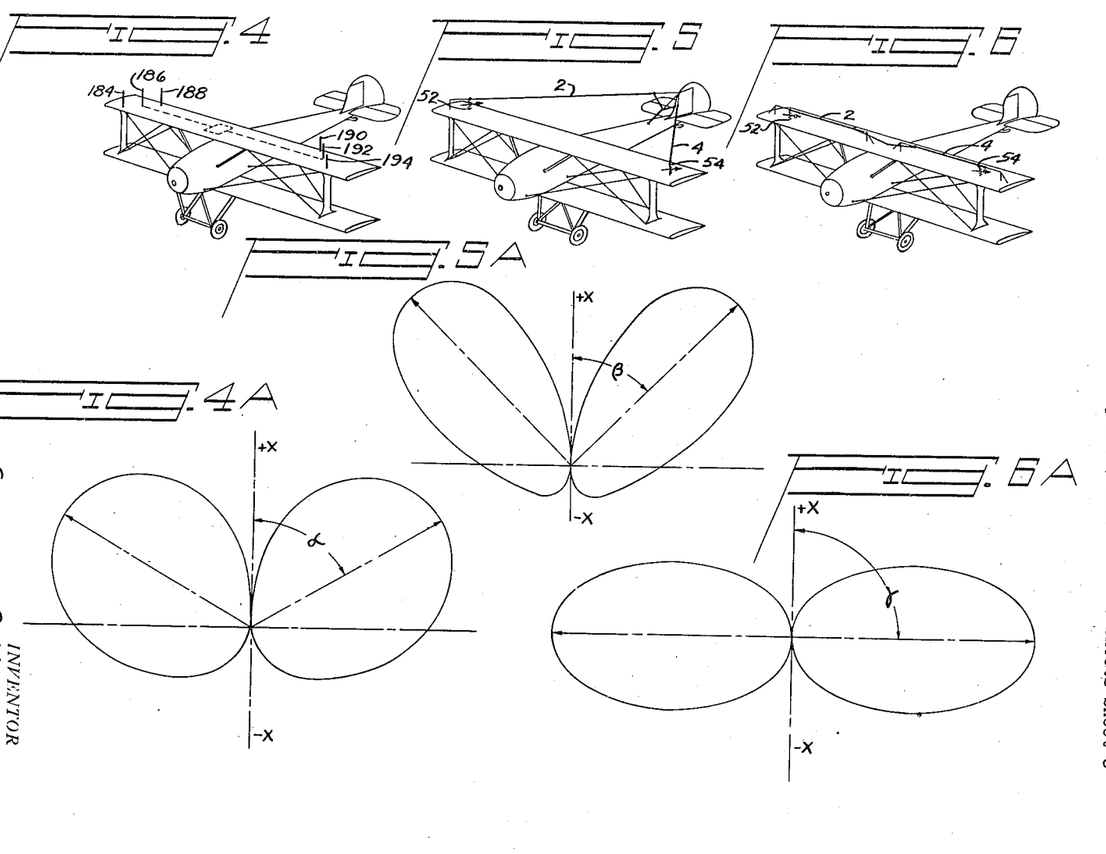
Figs. 4, 5 and 6 show various physical arrangements of antenna installations.
Figs. 4A, 5A, and 6A show the respective field patterns of the antenna arrangements of Figs. 4, 5, and 6.
Figures 6, 7:
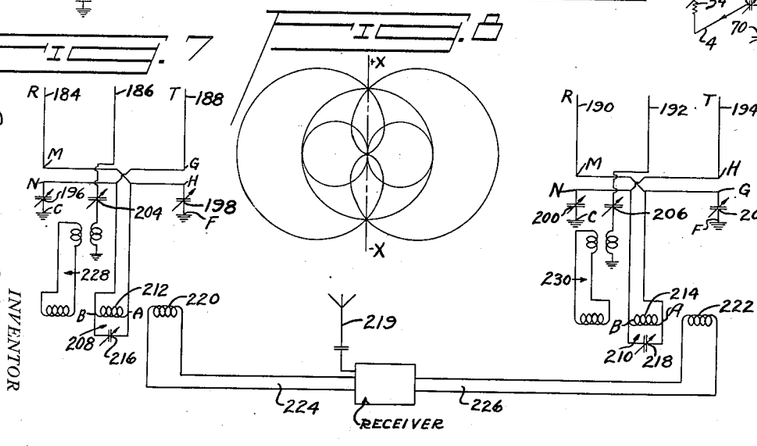
Fig. 7 shows a method of employing uni-directional Adcock antennae in my direction finder.

With reference to Figs. 4 and 7, two uni-directional Adcock antennae are shown, consisting of antenna conductors 184, 186 and 188, which form one uni-directional Adcock system and antenna conductors 190, 192 and 194, which form the other uni-directional Adcock system. The variable condensers 196 and 198, as well as 200 and 202, serve for balancing purposes of circuit branch R, M, A, B, G, T, against circuit branch C, N, B, A, H, F. The characteristics of antenna conductors 184 and 188, as well as 190 and 194 are that of a figure 8, whereas the characteristics of antenna conductors 186 and 192 are non-directional and equivalent to a circle. Under proper conditions by adjusting condensers 204 and 206 (Fig. 7) respectively, the superpositioning of the two characteristics will result in that of a cardioid. The respective antenna effects are being collected in tuned circuits 208 and 210 consisting of inductances 212 and 214 and variable tuning condensers 216 and 218. The coupling coils 220 and 222 are connected to the transmission lines 224 and 226 leading to the radio compass unit, (comprising receiver and modulator) the latter of which makes further use of a small auxiliary antenna 219. The antenna energies with respect to antenna conductors 186 and 192 are fed into collective circuits 208 and 210 by means of link circuits 228 and 230.

Fig. 5 shows a system using two uni-directional Beverage antennae disposed in V fashion. Resistances 52 and 54 are made variable in order that the respective directional characteristics of antennae 2 and 4 may be made equal to each other.

Fig. 6 is again using a system of two uni-directional Beverage antennae, however, arranged in a straight line. 52 and 54 are again variable resistances for the purpose of balancing the directional effects of the two antennae 2 and 4.

Figs. 4A, 5A, and 6A show the directional characteristics of the corresponding antenna systems represented in Figs. 4, 5, and 6.

The directional characteristics, as shown in Figs. 4A and 5A, indicate clearly that the sensitivity of one bearing indicator in one direction, for instance that lying in the positive X direction is greater than that obtained in the negative X direction since the resulting field vectors of antennae 2 and 4 are greatly reduced. If the antennae, however, are disposed as indicated in Fig. 6, a directional diagram of that shown in Fig. 6A is obtained. Here it may be seen that the sensitivity of the two bearing indications, namely +X and −X is substantially the same.

With regard to the operation of my invention, as, for instance, shown in Fig. 1, the uni-directional antennae 2 and 4 with their respective adjustable circuit impedances 52 and 54 are seen to be connected to a novel type of balanced modulator circuit of the common input type. This circuit has been fully described in my copending U. S. patent application Serial No. 5,566. Briefly, the operation of said circuit is as follows:

It is well known to those skilled in the art that in a balanced modulator circuit of the common input type side band frequencies are present in the mid branch of the two respective output circuits of the two vacuum tubes 10 and 12. The mid branch in this particular case constitutes coil 64. Since this coil is equivalent to a common coupling existing between the two respective plate circuits of vacuum tubes 10 and 12, it follows that any other coupling which is common to both said plate circuits will tend to produce side band frequencies in said coupling element. Referring to coils 56 and 58, it may be seen that since they are connected in parallel and respectively associated with inductances 20 and 22, they form a link circuit 55, which, in its nature, forms a common coupling element between the respective plate circuits of the balanced modulator circuit. Due to this coupling arrangement, it is therefore possible to produce uni-directional side band frequencies in coils 20 and 22 which are of a uni-directional character and which will, in combination with the carrier frequency received by antenna 63, form modulation products which after demodulation will result in a frequency which is equal to that of the audio frequency oscillator 14.

It may also be seen that the respective output circuits of the two vacuum tubes 10 and 12 are in a differential relation so that if the direction of the incoming radio waves is coincident with the common axis between the uni-directional antennae 2 and 4, no current will be induced in receiver coil 60 due to the absence of uni-directional side band frequencies. Likewise, if coil 60 is symmetrically disposed at the center position between coils 20 and 22, no currents could exist in said coil because the currents received by it from the link circuit coils 56 and 58 respectively will nullify each other. It is therefore essential to displace coil 60 from the center position of coils 56 and 58 resulting in differential side band frequencies as well as a differential carrier frequency which, if of sufficient magnitude, will permit the omission of the use of antenna 63. In any other direction differing from that of the direction of the common axis side band frequencies will be produced which, depending upon the sense of direction of the incoming radio waves, will predominate either in coil 20 or coil 22, thereby through the action of link circuit 55 producing a side band frequency current in receiver coil 60 and which in combination with a carrier current supplied either by the antenna 63 or by the inherent differential carrier frequency will after demodulation result in an audio frequency current which is now, as regards magnitude and phase, a function of the direction of the incoming radio waves. Since the phase of the side band frequency currents is reversed when the direction of the incoming radio waves passes from one side of the common axis to the other, it follows that the audio frequency output current will serve to indicate the direction of the incoming radio waves, since the directional indication is based upon a measurement of the magnitude, as well as the phase polarity of the fundamental component of the modulation produced by the balanced modulator circuit.

Referring now to Fig. 2, it is shown that the input circuits of the respective antennae 2 and 4 consist of tuned circuits 61 and 62 that are both tuned to the frequency of the incoming radio wave. The purpose of these tuned circuits is to render the potential on the respective control grids of modulator tubes 57 and 59 as large as possible. By means of the beat frequency oscillator 82 the incoming radio frequency is converted into an intermediate frequency by supplying the shielded grids 72 and 74 of the two modulators 57 and 59 respectively with a potential having a frequency, the latter being selected either to be of the frequency of the incoming wave plus the intermediate frequency or minus the intermediate frequency. The magnitude of capacities 76 and 78 is purposely chosen small in order to render the respective capacitive reactances sufficiently large to prevent interaction between the two modulator circuits 61 and 62. It will be noted that the collective circuits 90 and 92, which are tuned to the intermediate frequencies respectively are arranged in differential fashion with respect to the secondary winding 99. Radio frequency energy is received continuously from both antennae 2 and 4 and assuming the direction of the incoming radio waves to be normal to the plane containing the two antennae 2 and 4, the energy in circuit 90 is equal and opposite to that of circuit 92 (provided, of course, that resistances 52 and 54 are properly adjusted). Therefore, no energy will be present in the secondary winding 99. The circuit immediately following the secondary winding 99 is a balanced modulator circuit 126 of the "conjugate" input type. The operation of this type modulator circuit is well known in the art and therefore no further explanation as to its operation is being made except it may be said that the currents flowing in the two respective halves of output coil 102 of the balanced modulator 126 will carry side band frequencies with the carrier frequency suppressed. The corresponding currents of these side bands are uni-directional, first because of the uni-directional characteristics of antennae 2 and 4 and second because of the differential relation between the respective output circuits 90 and 92 with respect to the input circuit of the balanced modulator 126. The small auxiliary antenna 182 being capacitively coupled over condenser 128 to the link circuit 129 furnishes in combination with the beat frequency of beat frequency oscillator 82 the intermediate frequency carrier by virtue of the magnetic coupling existing between coils 101 and 130 of the intermediate frequency mixing transformer.

Both inductance coils 101 and coil 102 are coupled to inductance coil 130, the latter of which in connection with condenser 136 forms the tuned input circuit 125 of the first intermediate frequency amplifier indicated as a whole as 132. Since coils 101 carry the intermediate frequency carrier current while coil 102 carries the side bands produced from the intermediate carrier by the action of the balanced modulator circuit 126, the addition of the two in the common tuned circuit 125 produces a modulated carrier of intermediate frequency, which is supplied to the common intermediate amplifier 132. It is well known in the radio art that the phase of the audio envelope produced by the combination of the carrier and two side bands may be reversed 180° by either the reversal of the phase of the carrier current or by the reversal of the phase of the side band currents provided, however, that the latter are not in phase quadrature with the carrier current. The side bands being of different frequencies from each other and from the carrier as well, during a small period of time, which is small in comparison with the length of the modulation cycle, have a definite phase relation. For example, if the two side bands both pass through a maximum on that part of the modulation cycle that the carrier is passing through zero, it can be shown that in this instance the side bands and the carrier are in phase quadrature. The resultant modulating envelopes in this case is of double the modulating frequency of audio frequency oscillator 119. On the other hand, if the side bands pass through a simultaneous maximum when the carrier is passing through a maximum having the same polarity respectively, then both side bands and carrier may be said to be effectively in phase and the resultant audio envelope will be of the original modulating frequency of audio frequency oscillator 119. Since the phase of the side bands is reversed when the phase of the intermediate frequency carrier current existing in coil 99 is reversed (by letting the direction of the incoming radio waves pass from one side of the normal of the plane containing the two uni-directional antennae 2 and 4 to the other), it may be seen that the phase polarity of the audio intermediate frequency amplifier 132 will be an indication of the direction of the incoming radio waves. It is to be noted that the auxiliary antenna 182, which in combination with the beating oscillator current furnishes the intermediate frequency carrier, serves the purpose of detecting the directional audio frequency envelope, with the result of the combination of the intermediate frequency carrier with the uni-directional intermediate frequency side bands.

The well-known phase and amplitude relation, for instance, which exists where loop and antenna effects are to be combined in order to arrive at a cardioid characteristic, as shown in the case of antenna combinations illustrated in Fig. 7 with the corresponding directional diagram Fig. 8, is no longer applicable as soon as the directional antenna means employed have a uni-directional character. If a cardioid has to be produced it follows that the maximum respective antenna effects of loop and antenna must be the same in two directions substantially 180° apart. Here the purpose is to arrive at a uni-directional characteristic by combining the directional characteristic of a loop (being a figure 8) and that of a vertical antenna (being a circle) with the provision that the maximum amplitudes received by the loop and the vertical antenna are to be made equal.

Since the directional indication is based upon a measurement of the magnitude as well as the phase of the fundamental component of the modulation produced by the balanced modulator circuit and because the relative magnitude of the fundamental component of the modulation is dependent upon the effective phase relation existing between side bands and carrier frequency currents, the accuracy of indication in a measure is dependent upon the maintenance of a constant phase relation from the uni-directional antennae through to the point of combination at the first intermediate frequency amplifier. The circuit from the first intermediate frequency amplifier 132 to the audio output of audio frequency amplifier 154 is not new and typical of any of the existing radio receiver circuits which are employed for radio telephone reception. Since the audio frequency output from the receiver produced by the modulating action of the balanced modulator 126 is in synchronism with the audio frequency output of audio frequency oscillator 119 transferred respectively through one of the two tertiary coils 122 over to the capacity 46 to the field coil 44 of the indicating instrument 34 and since the phase polarity of the audio frequency output from the receiver produced by the balanced modulator circuit is a function of the direction of the incoming radio waves, it will either add to the audio frequency current derived directly from the audio frequency oscillator 119 on one half of the modulation cycle and subtract on the other half of the modulation cycle, thereby producing a deflection of the indicator needle of indicating instrument 34, the magnitude of which is proportional to the magnitude of the audio frequency output of the receiver and the current derived directly from the audio frequency oscillator 119.

Figure 3:
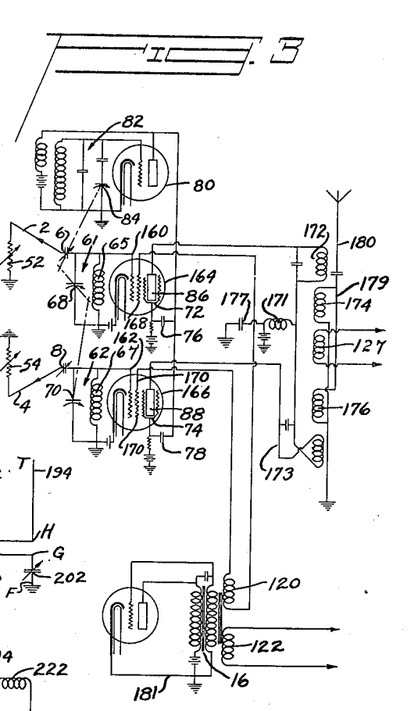
Fig. 3 shows one particular circuit arrangement using pentode vacuum tube modulators.

With regard to the operation of the circuit arrangement shown in Fig. 3, the uni-directional antennae 2 and 4 with their respective adjustable circuit impedances 52 and 54 are seen to be connected to two tunable circuits 61 and 62. In quite a similar manner as indicated in Fig. 1 this circuit arrangement makes use of the novel type of balanced modulator circuit of the common input type and which has been fully described in my copending U. S. application Serial No. 5,566.

In addition to using two separate modulator tubes together with a balanced modulator circuit, as shown in Fig. 2, it may be seen that the functions performed by said modulator tubes and said balanced modulator circuit are performed by two tubes alone, namely tubes 164 and 166, being of the pentode type (see Fig. 3). The mid branch circuit in this particular case constitutes coil 171 and condenser 177. Referring to coils 174 and 176 it may again be seen that since they are connected in parallel and respectively associated with inductances of circuits 172 and 173 they form a link circuit 179, which in its nature forms a common coupling element between the respective intermediate frequency plate circuits 172 and 173 of the balanced modulator circuit. Due to this coupling arrangement, it is therefore possible to produce uni-directional side band frequencies in circuits 172 and 173 and which will, in combination with a carrier frequency received by antenna 180 form modulation products which, after demodulation, will result in a frequency which is equal to that of the audio frequency oscillator 181. It also may be seen that the respective output circuits 172 and 173 are in a differential relation to each other so that if the direction of the incoming radio waves is coincident with the common axis between the two uni-directional antennae 2 and 4, no current will be induced in receiver coil 182 due to the absence of the uni-directional side band frequencies.

Likewise, if coil 127 is symmetrically disposed at the center position between coils 174 and 176 no currents could exist in said coil because the currents received from the link circuit 179 will nullify each other. It is therefore essential to displace coil 182 from the center position of coils 174 and 176 resulting in differential side band frequencies as well as a differential carrier frequency, which, if of sufficient magnitude will permit the omission of the use of antenna 180. In any other direction which differs from that of the direction of the common axis of the two uni-directional antennae side band frequencies will be produced which, depending upon the sense of the direction of the incoming radio waves will predominate either in coil 172 or in coil 173, thereby, through the action of link circuit 179 producing side band frequency currents in receiver coil 182 and which in combination with a carrier current either supplied by the antenna 180 or by the inherent differential carrier frequency due to the unsymmetrical position of coil 127 will after demodulation result in an audio frequency current which is now, as regards magnitude and phase, a function of the direction of the incoming radio waves. The directional right and left indication of the indicator is based upon a measurement of the magnitude as well as the phase polarity of the fundamental audio frequency component of the modulation produced by the balanced modulator circuit because the phase of the side band frequency currents is reversed when the direction of the incoming radio waves passes from one side of the common axis to the other. The output current of coil 127 is connected to an intermediate frequency amplifier circuit, detector circuit, indicator circuit and audio frequency oscillator circuit in the identical manner as shown in Fig. 2.

Having described my invention, what I claim and desire to secure by Letters Patent is:

1. In a direction finding device, two antenna means having uni-directional characteristics arranged to receive signaling energy of maximum intensity in two directions that are symmetrical to a common axis, antenna means having a non-directional characteristic, means for locally producing a current having a known frequency differing from the frequency received by an intermediate frequency and having constant amplitude, means for combining the currents of each of said unidirectional antenna means and said non-directional antenna means with said locally produced current to thereby produce currents respectively corresponding to said intermediate frequency, a second local means to produce a current of known frequency and constant amplitude, means combining the intermediate frequency currents of each of said uni-directional antenna means with said second locally produced current to produce currents having frequencies equal to the sum and difference of said second locally produced current and that of the intermediate frequency currents of said uni-directional antenna means, and having an amplitude varying with the angle of deviation of said axis from a straight line to the transmitting station, and means for combining the intermediate frequency current of said non-directional antenna means with said sum and difference frequencies of the uni-directional antenna means to produce a current of said second-mentioned known frequency, the amplitude of which is a function of the angle of deviation of said axis from said straight line.

2. A direction finding device of the visual right and left indicating type, two antenna means having uni-directional characteristics arranged to receive signaling energy of maximum intensity in two directions that are symmetrical to a common axis, antenna means having a non-directional characteristic, means for locally producing a current having a known frequency differing from the frequency received by an intermediate frequency and having constant amplitude, means for combining the currents of each of said uni-directional antenna means and said non-directional antenna means with said locally produced current to thereby produce currents respectively corresponding to said intermediate frequency, a second local means to produce a current of known frequency and constant amplitude, means combining the intermediate frequency currents of each of said uni-directional antenna means with said second locally produced current to produce currents having frequencies equal to the sum and difference of said second locally produced current and that of the intermediate frequency currents of said uni-directional means and having an amplitude varying with the angle of deviation of said axis from a straight line to the transmitting station and differing in phase dependent upon whether said axis is deviated to the right or left of said line, means for combining the intermediate frequency current of said non-directional antenna means with said sum and difference frequencies of the uni-directional antenna means to produce a current of said second-mentioned known frequency, the amplitude of which is a function of the angle of deviation of said axis from said straight line, and visual indicating means connected with said combining means and said second local means for producing right and left indications.

3. In a direction finding device of the visual right and left indicating type, two antenna means arranged to receive signaling energy of maximum intensity in two directions that are symmetrical to a common axis and having adjustable means to produce substantially equal uni-directional characteristics, antenna means having a non-directional characteristic means for locally producing a current having a known frequency differing from the frequency received by an intermediate frequency and having constant amplitude, means for combining the currents of each of said uni-directional antenna means and said non-directional antenna means with said locally produced current to thereby produce currents respectively corresponding to said intermediate frequency, a second local means to produce a current of known frequency and constant amplitude, means combining the intermediate frequency currents of each of said uni-directional antenna means with said second locally produced current to produce currents having frequencies equal to the sum and difference of said second locally produced current and that of the intermediate frequency currents of said uni-directional means and having an amplitude varying with the angle of deviation of said axis from a straight line to the transmitting station and differing in phase dependent upon whether said axis is deviated to the right or left of said line, means for combining the intermediate frequency current of said non-directional antenna means with said sum and difference frequencies of the uni-directional antenna means to produce a current of said second-mentioned known frequency, the amplitude of which is a function of the angle of deviation of said axis from said straight line, and visual indicating means connected with said combining means and said second local means for producing right and left indications.

4. In a direction finding device of the visual right and left indicating type, two antenna means arranged to receive signaling energy of maximum intensity in two directions that are symmetrical to a common axis and having adjustable means to produce substantially equal uni-directional characteristics, non-directional antenna means, a tunable circuit associated with each of said uni-directional antenna means, a tunable oscillator circuit for locally producing a current having a known frequency differing from the frequency received by an intermediate frequency and having constant amplitude associated with said tunable circuits and with said non-directional antenna means, means for combining the currents of each of said uni-directional antenna means and said non-directional antenna means with said locally produced current to thereby produce currents respectively corresponding to said intermediate frequency, a second local means to produce a current of known frequency and constant amplitude, means combining the intermediate frequency currents of each of said uni-directional antenna means with said second locally produced current to produce currents having frequencies equal to the sum and difference of said second locally produced current and that of the intermediate frequency currents of said uni-directional means and having an amplitude varying with the angle of deviation of said axis from a straight line to the transmitting station and differing in phase dependent upon whether said axis is deviated to the right or left of said line, means for combining the intermediate frequency current of said non-directional antenna means with said sum and difference frequencies of the uni-directional antenna means to produce a current of said second-mentioned known frequency, the amplitude of which is a function of the angle of deviation of said axis from said straight line, visual indicating means connected with said combining means and said second local means for producing right and left indications, and mechanical means connecting the tuning elements of said tunable circuits for simultaneously controlling said circuits.

5. In a direction finding device of the visual right and left indicating type, two antenna means having uni-directional characteristics arranged to receive the signaling energy of maximum intensity in two directions that are symmetrical to a common axis, antenna means having a non-directional characteristic, means for locally producing a current having a known frequency differing from the frequency received by an intermediate frequency and having constant amplitude, means for combining the currents of each of said uni-directional antenna means and said non-directional antenna means with said locally produced current to thereby produce currents respectively corresponding to said intermediate frequency, a receiving circuit, a balanced modulator circuit having an input circuit and an output circuit and a second local oscillator to produce a current of known frequency and constant amplitude associated with said circuits to produce currents having frequencies equal to the sum and difference of said second locally produced current and that of the intermediate frequency currents of said uni-directional means and having an amplitude varying with the angle of deviation of said axis from a straight line to the transmitting station and differing in phase dependent upon whether said axis is deviated to the right or left of said line, said balanced modulator circuit being adjustably differentially connected at its input with said uni-directional antenna means and adjustably differentially connected at its output with said non-directional antenna circuit and receiving circuit to obtain null points substantially 180° apart coincident with said common axis, and visual means connected to the output of said receiving circuit and to said second local oscillator for utilizing the currents received from said receiving circuit to obtain visual indications.

6. In a direction finding device of the visual right and left indicating type, two antenna means arranged to receive signaling energy of maximum intensity in two directions that are symmetrical to a common axis and having adjustable means to produce substantially equal uni-directional characteristics, non-directional antenna means, a tunable circuit associated with each of said uni-directional antenna means, a tunable oscillator circuit for locally producing a current having a known frequency differing from the frequency received by an intermediate frequency and having constant amplitude associated with said tunable circuits and with said non-directional antenna means, means for combining the currents of each of said uni-directional antenna means and said non-directional antenna means with said locally produced current to thereby produce currents respectively corresponding to said intermediate frequency, a second local means to produce a current of known frequency and constant amplitude, means combining the intermediate frequency currents of each of said uni-directional antenna means with said second locally produced current to produce currents having frequencies equal to the sum and difference of said second locally produced current and that of the intermediate frequency currents of said uni-directional means and having an amplitude varying with the angle of deviation of said axis from a straight line to the transmitting station and differing in phase dependent upon whether said axis is deviated to the right or left of said line, means for combining the intermediate frequency current of said non-directional antenna means with said sum and difference frequencies of the uni-directional antenna means to produce a current of said second-mentioned known frequency, the amplitude of which is a function of the angle of deviation of said axis from said straight line, visual indicating means connected with said combining means and said second local means for producing right and left indications.

GEOFFREY G. KRUESI.